May 10, 1966  C. B. HACKNEY ETAL  3,250,930
LEAD SEAL FOR DYNAMOELECTRIC MACHINE
Filed April 22, 1963

Inventors
Carl B. Hackney
Virgil R. Scardina
By Robert B. Benson
Attorney

# United States Patent Office 3,250,930
Patented May 10, 1966

3,250,930
LEAD SEAL FOR DYNAMOELECTRIC MACHINE
Carl B. Hackney, Bethel, and Virgil R. Scardina, Milford, Ohio, assignors to Allis-Chalmers Manufacturing Company, Milwaukee, Wis.
Filed Apr. 22, 1963, Ser. No. 274,615
7 Claims. (Cl. 310—71)

This invention relates generally to dynamoelectric machines and more particularly to an improvement in sealing the electric leads that connect the stator windings to external terminals where the leads extend through a passage in the machine yoke.

Electric leads in totally enclosed and explosion proof dynamoelectric machines have been sealed in the past by pouring a sealing material, such as a combination of plaster of paris, quick-set cement and water around the leads where they extend through a passage in the machine yoke. In open, submersible type dynamoelectric machines, the unit is first encapsulated. Tubing is positioned to surround the leads and then filled with epoxy resin.

Both of these seals and their processes of construction have disadvantages. Regarding the former type, the seal may not develop enough strength to resist any explosions occurring in the machine because of a lack of sufficient cross section. Pourable viscous material is needed to seal shut the passage with the leads therein. Yet, the passage does not have a bottom and is limited in length to the thickness of the yoke wall. Consequently, too little or too much sealing material can be used. A defective seal therefore can result from a process which in itself is inefficient and wasteful. The seal further is limited to the yoke passage and does not prevent conductor fatigue resulting from the flexing of basically the entire length of the leads during machine operation. The latter type seal for the submersible machine does utilize a tubular member surrounding the leads which is then filled with sealing material. However, the process is inefficient because the member is not rigidly attached to the yoke. Use of a separate holding means would be required to prevent the movement of the member in the direction of sealant flow and also to insure separation of the leads and thus more satisfactory sealing. Further, sealing material is required around the exterior of the tubular member to the periphery of the passage. As in the seal for the explosion proof machine, this space does not have a bottom. Consequently, this portion of the process is inefficient and the resulting part of the seal is of inconsistent effectiveness. This would be true also of the seal in the tubular member if the holding means mentioned before was not utilized.

Applicants have determined that an effective and consistent seal and lead support results if: an inwardly tapering seat is provided through which electric leads extend to the exterior of the yoke; positioning a tubular member so that it surrounds the leads and extends from well inside the yoke to the seat which it rigidly engages; filling the member and the aperture outward of the seat with a predetermined amount of solid setting sealing material. The process described, besides being more efficient, also eliminates the need for any holding means.

It is, therefore, an object of this invention to provide a more efficient process for sealing the leads on a dynamoelectric machine.

Another object is to provide a seal on a dynamoelectric machine that is of consistent effectiveness.

Another object is to support, in addition to sealing, electric leads so that smaller leads can be used on dynamoelectric machines.

Other objects and advantages will become apparent from the following description in conjunction with the attached drawings in which.

Figure 1:
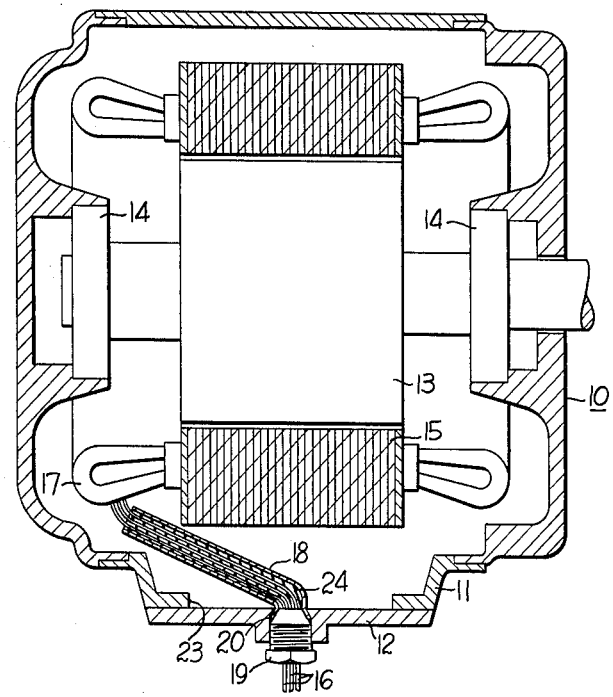
FIG. 1 is a full top section of a dynamoelectric machine incorporating the sealing device.
Figures 2, 3:
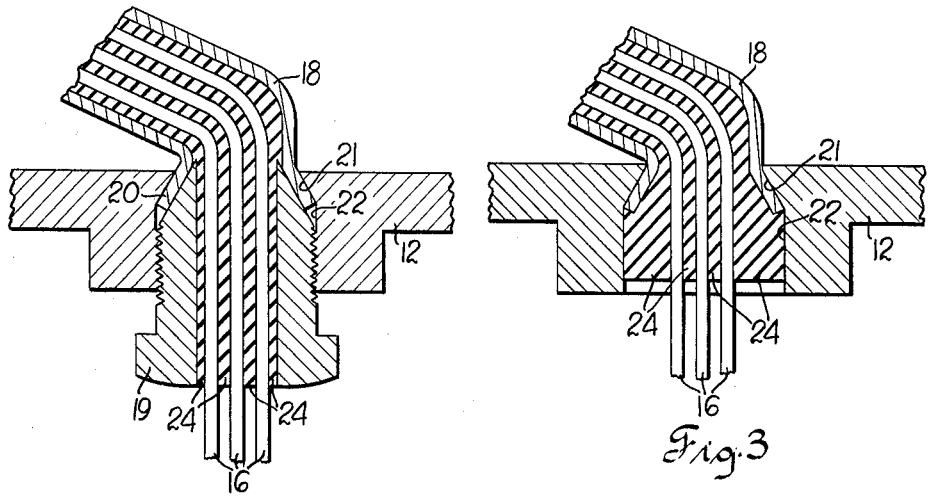
FIG. 2 is an enlarged top section of a portion of the sealing device.
FIG. 3 is an enlarged top section of a portion of another embodiment of the sealing device.

Referring to FIGS. 1 and 2, this invention is illustrated generally in a dynamoelectric machine 10. The yoke or field frame 11 of the machine 10 has a face plate 12 mounted thereon. The rotor 13 mounted in bearings 14 is located within the bore of the stator 15. Electric leads 16 connect to stator coil ends 17. The leads extend through tubular member 18 and forming nut 19 (which is threaded into the face plate) to the exterior of the machine. One end 20 of the tubular member 18 is engaged, formed and clamped by the nut to the inwardly tapering seat 21 located in the opening 22 in the face plate; which opening is aligned with the passage 23 in the yoke. Sealing material 24 fills the length of the tubular member and the forming nut.

FIG. 3 discloses another embodiment of the device wherein the tubular member is effectively restrained by rigidly engaging the tapered seat prior to the insertion of the sealing material.

In the preferred sealing process as shown in FIGS. 1 and 2, the electric leads from the stator coil ends are drawn through the yoke passage 23. A flexible tubular member 18 is positioned so that it surrounds these leads and then forced a predetermined distance through the passage into the interior of the yoke. Preferably one end of the tubular member extends to substantially the junction of the leads and the coil ends. The other end 20 of the member projects from the yoke an amount approximately equal to the length of the face plate seat. The face plate 12 is then positioned so that the leads extend through the opening 22, but the tubular member extends only to the length of the seat 21. The face plate is then rigidly attached to the yoke. A forming nut 19 is so located that the electric leads extend through a hole therein. The nut engages the thread in the face plate that extends from the seat outward from the yoke. Tightening the forming nut causes its tapered end to advance into the interior of end 20 of member 18, engage it and force it to conform, and rigidly clamp it to the seat in the face plate. A predetermined amount of solid setting sealing material 24 is forced the length of the member and the nut, filling the space therein and around each individual lead. (Preferably the leads are held in separated fashion during the operation.) Upon curing, the leads are effectively sealed throughout the sealing area, and the solid mass prevents flexing and, therefore, fatigue in the leads during machine operation.

Having thus described the invention, it will be realized that the drawings merely show a preferred embodiment thereof, and that various changes in size, shape or arrangement of parts may be employed without departing from the spirit of the invention or the scope of the appended claims.

Having now particularly described and ascertained the nature of our said invention and the manner in which it is to be performed, we declare that what we claim is:

1. A dynamoelectric machine comprising: a yoke having a passage therethrough, said yoke passage having an inwardly tapering seat; a stator mounted in said yoke and having a winding positioned thereon; electric leads extending from said winding through said passage; a tubular member surrounding said leads, one end of said member extending into the interior of said yoke and the other end having a flared portion engaging said seat;

and a flowable solid setting sealing material filling said member and said passage outward of said seat to seal said leads and to prevent flexing of said leads during machine operation, said tubular member acting as a container to restrict the flow of said sealing material about said leads as said sealing material solidifies.

2. The machine of claim 1 in which the tubular member is made of a flexible material.

3. A dynamoelectric machine comprising: a yoke having a passage therethrough, said yoke passage having an inwardly tapering seat and an internal thread extending from short of said seat outwardly toward the exterior of said yoke; a stator mounted in said yoke and having a winding positioned thereon; electric leads extending from said winding through said passage; a tubular member surrounding said leads, one end of said member extending into the interior of said yoke and the other end having a flared portion engaging said seat; a nut engaging said thread, said nut having a hole through which said leads extend and a tapered end which engages and clamps the end of said tubular member to said seat; and a flowable solid setting sealing material filling said member and nut to seal said leads and to prevent flexing of said leads during machine operation, said tubular member acting as a container to restrict the flow of said sealing material about said leads as said sealing material solidifies.

4. A dynamoelectric machine comprising: a yoke having a passage therethrough, said yoke passage having an inwardly tapering seat and an internal thread extending from short of said seat outwardly toward the exterior of said yoke; a stator mounted in said yoke and having a winding positioned thereon; electric leads extending from said winding through said passage; a tubular member surrounding said leads, one end of said member extending into the interior of said yoke and the other end extending into said passage: a nut engaging said thread, said nut having a hole through which said leads extend and a tapered end which engages, forms and clamps the end of said tubular member to said seat; and a flowable solid setting sealing material filling said member and said nut to seal said leads and to prevent flexing of said leads during machine operation, said tubular member acting as a container to restrict the flow of said sealing material about said leads as said sealing material solidifies.

5. A dynamoelectric machine comprising: a yoke having a passage therethrough; a face plate mounted on said yoke and having an opening therethrough aligned with said passage, said face plate opening having an inwardly tapering seat; a stator mounted in said yoke and having a winding positioned thereon; electric leads extending from said winding through said passage and said opening; a tubular member surrounding said leads, one end of said member extending into the interior of said yoke and the other end having a flared portion engaging said seat; and a flowable solid setting sealing material filling said member and said opening outward of said seat to seal said leads and to prevent flexing of said leads during machine operation, said tubular member acting as a container to restrict the flow of said sealing material about said leads as said sealing material solidifies.

6. The machine of claim 1 in which said flared portion acts as a funnel to direct said sealing material into said tubular member.

7. The machine of claim 6 wherein said tubular member extends into the interior of said yoke to substantially the junction of said leads and windings.

References Cited by the Examiner

UNITED STATES PATENTS

| 3,077,515 | 2/1963 | Divers | 174—151 |

FOREIGN PATENTS

| 17,333 | 5/1916 | Great Britain. |
| 894,270 | 4/1962 | Great Britain. |
| 904,673 | 8/1962 | Great Britain. |

MILTON O. HIRSHFIELD, *Primary Examiner.*

ORIS L. RADER, *Examiner.*

A. J. ROSSI, *Assistant Examiner.*